J. F. CUMMINGS.
BRAKE.
APPLICATION FILED JULY 24, 1908.

925,304.

Patented June 15, 1909.
2 SHEETS—SHEET 1.

Witnesses

Inventor
John F. Cummings.
By Victor J. Evans
Attorney

J. F. CUMMINGS.
BRAKE.
APPLICATION FILED JULY 24, 1908.
925,804.
Patented June 15, 1909.
2 SHEETS—SHEET 2.
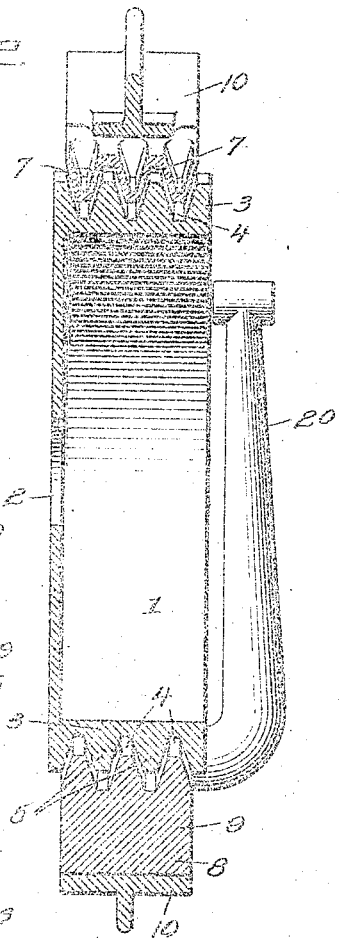
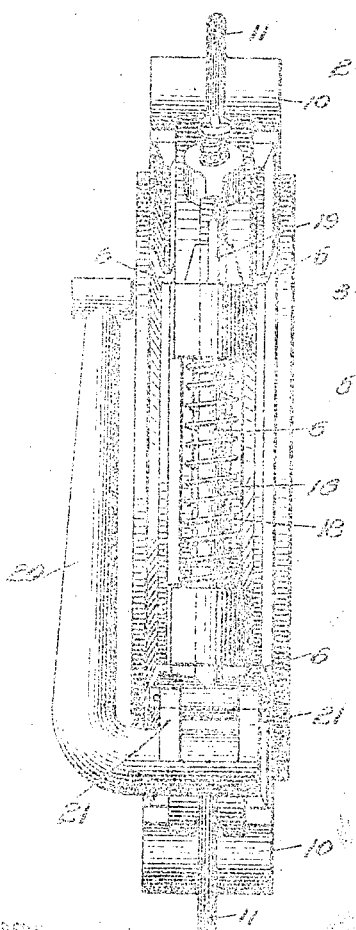
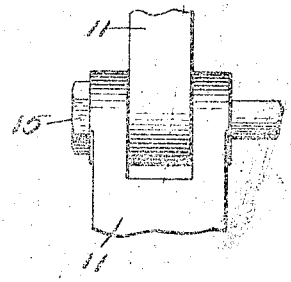
Inventor
John F. Cummings.

UNITED STATES PATENT OFFICE.

JOHN F. CUMMINGS, OF PROVIDENCE, RHODE ISLAND.

BRAKE.

No. 925,304.

Specification of Letters Patent.

Patented June 15, 1909.

Application filed July 24, 1908. Serial No. 445,247.

*To all whom it may concern:*

Be it known that I, JOHN F. CUMMINGS, a citizen of the United States, residing at Providence, in the county of Providence and State of Rhode Island, have invented new and useful Improvements in Brakes, of which the following is a specification.

This invention relates to brakes, designed more particularly for use on automobiles, but capable of use in other relations, and one of the principal objects of the invention is to provide means whereby the brake shoes are assured absolute contact with the rotary brake element.

In a brake in which the rotary element is provided with grooves and intermediate ribs extending around the periphery it has been found difficult to provide a brake shoe having a similar face to the brake element and to mount said shoe so that the ribs and grooves on the shoe will have absolute contact on the ribs and grooves of the brake element without being provided with the necessary movement to permit the shoe to automatically adjust itself to the required positions. In other words, the curved shoe must be mounted to have an automatic lateral movement as well as a movement radially to permit the ribs on said brake shoe to have absolute contact with the co-acting face of the brake element.

My present invention is designed for the purpose of overcoming the defect referred to in a brake of the class described.

Figure 1:
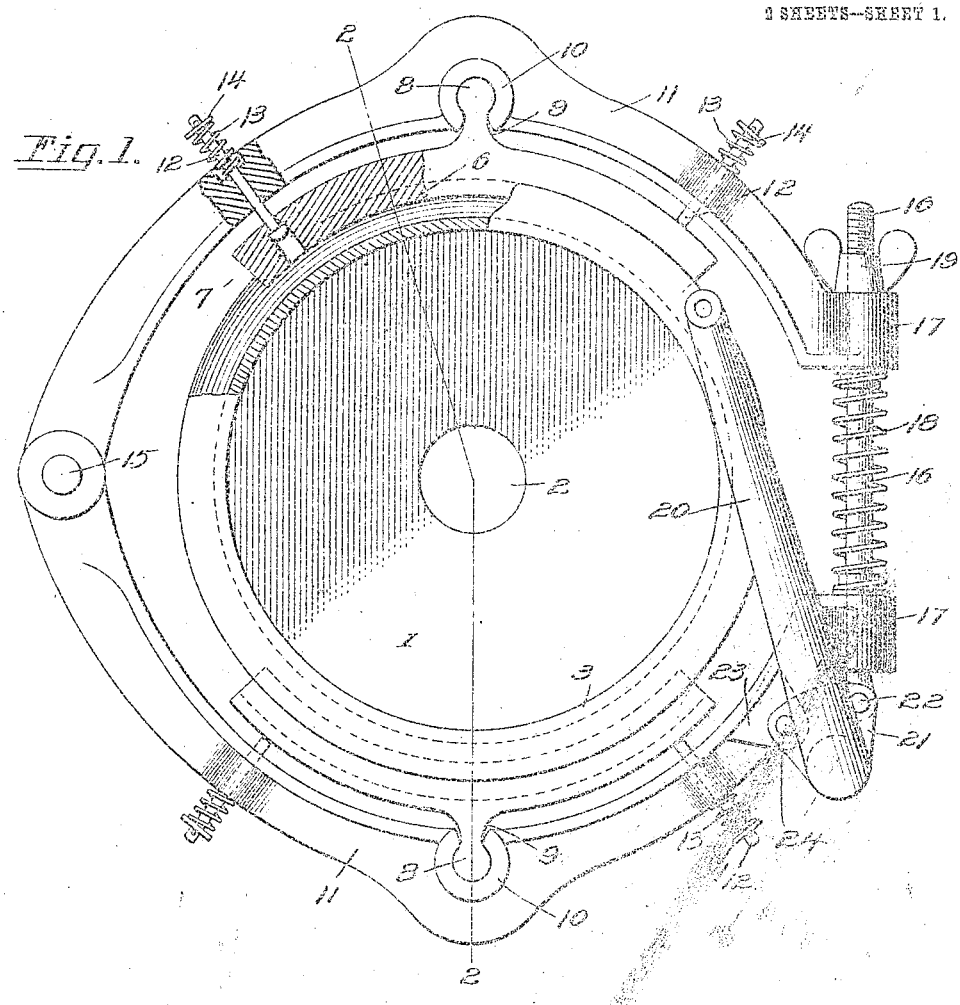
Figure 5:
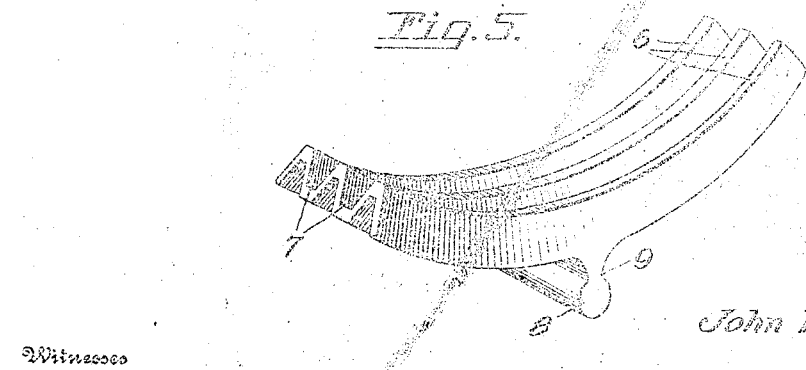

The objects and advantages of my invention may be attained by means of the construction illustrated in the accompanying drawings, in which, Figure 1 is a side elevation and partial section of a brake embodying my invention, Fig. 2 is a sectional view taken on the line 2—2 of Fig. 1, Fig. 3 is an edge view of the brake, Fig. 4 is a detail view in elevation of the joint connecting the two members of the brake lever, Fig. 5 is a detail perspective view of one of the brake shoes.

Referring to the drawings, the numeral 1 designates the brake element provided with a central aperture 2 through which the axle of the vehicle projects and upon which the brake element is mounted to rotate. A peripheral flange 3 surrounds this brake element and said flange is provided with grooves 4 extending entirely around the periphery of said flange. The ribs 5 are intermediate the grooves 4 and said grooves and ribs form the brake surface for said element.

The brake shoes each consist of a curved shoe having ribs 6 and intermediate grooves 7, the ribs and grooves conforming in size, shape and curvature to the ribs and grooves of the brake element. Formed upon the outer side and centrally of each brake shoe is a bead 8 provided with a reduced neck 9, said bead being mounted in a substantially tubular guide or keyway 10, formed on each of the members 11 of the brake lever. By means of this construction the brake shoes are permitted to rock and to move laterally with respect to the brake element in order that the ribs 6 will be assured frictional contact in the grooves 4 of the brake element and in order that the shoes may assume this position automatically when the brake lever is operated.

In order to prevent the opposite ends of the brake shoes from coming into contact with the brake element 1 in use, pins 12 are extended through the members 11 and through the brake shoes, said pins having heads on their inner ends to prevent them from being withdrawn from the brake shoes, and said pins 12 being provided with encircling springs 13 which bear at one end upon a collar 14 while their opposite ends bear upon the members 11. The brake levers are pivoted at 15 as shown in Fig. 4 and the two members are connected together by means of a bolt 16 extending through apertures in the bosses 17 and a spring 18 surrounds the bolt 16 and bears against said bosses to support the members 11 and to withdraw the brake shoes from the brake element. A winged nut 19 is applied to the threaded end of the bolt 16 for adjusting the brake levers relatively to the brake element. The operating lever 20 of the brake is provided with spaced lugs 21 between which the bolt 16 is pivoted at 22 and a lug 23 formed on one of the members 11 is connected by a pivot 24, so that the movement of the lever 20 moves the bolt 16 to apply the brake shoes to the brake element, as will be understood.

From the foregoing it will be obvious that the brake shoes being mounted in the levers to have both a radial rocking movement and a movement relatively lateral to the brake element the ribs and grooves of the shoe and brake element will have absolute frictional contact upon moving the brake lever.

My invention is of comparatively simple construction, can be produced at comparatively slight cost, the brake is light in weight, is strong, durable and efficient and is exceedingly powerful owing to the fact that the brake surface has an extended area owing to the surfaces presented by the grooves and intermediate ribs.

I claim:

1. A brake comprising a brake element, brake levers pivotally connected together, brake shoes mounted in said brake levers, said brake shoes each having a bead and a contracted neck mounted in a keyway in the brake levers, whereby a radial and a lateral movement are automatically permitted to said brake shoes upon operation of the brake levers, and means for normally holding the ends of the brake shoes away from the brake element.

2. A brake comprising a rotary element, grooves and intermediate ribs formed upon the periphery of said element, brake levers pivotally connected together, brake shoes connected to said levers, said brake shoes having grooves and intermediate ribs to fit the grooves and ribs of the rotary element, lateral beads formed upon said brake shoes and a lateral keyway in each of said levers to receive said beads, and springs for holding said shoes at their ends away from said rotary element, whereby said shoes are permitted to have lateral play to insure the contact of the ribs on the shoes with the grooves on said element.

3. A brake comprising a rotary element provided with grooves and intermediate ribs upon its periphery, in combination with brake levers provided with lateral keyways, and brake shoes provided with ribs and intermediate grooves, said shoes having beads mounted in the keyways to provide lateral movement of said shoes relatively to said brake element.

In testimony whereof I affix my signature in presence of two witnesses.

JOHN F. CUMMINGS.

Witnesses:
J. W. GARNER,
E. E. WARFIELD.